(12) United States Patent
Schweikart et al.

(10) Patent No.: US 7,416,596 B2
(45) Date of Patent: Aug. 26, 2008

(54) USE OF A PIGMENT COMPOSITION COMPRISING MIXED CRYSTALS BASED ON CI PIGMENT YELLOW 74

(75) Inventors: Karl-Heinz Schweikart, Eschborn (DE); David Blum, Bad Soden (DE); Felix W. Grimm, Hofheim (DE); Martin U. Schmidt, Frankfurt am Main (DE); Josef Geisenberger, Sulzbach (DE)

(73) Assignee: Clariant Produkte (Deutschland) GmbH, Frankfurt (DE)

( * ) Notice: Subject to any disclaimer, the term of this patent is extended or adjusted under 35 U.S.C. 154(b) by 0 days.

(21) Appl. No.: 10/590,828

(22) PCT Filed: Feb. 11, 2005

(86) PCT No.: PCT/EP2005/001375

§ 371 (c)(1),
(2), (4) Date: Aug. 25, 2006

(87) PCT Pub. No.: WO2005/083010

PCT Pub. Date: Sep. 9, 2005

(65) Prior Publication Data

US 2007/0169665 A1    Jul. 26, 2007

(30) Foreign Application Priority Data

Mar. 1, 2004    (DE) ................ 10 2004 010 448

(51) Int. Cl.
C09D 11/00 (2006.01)
C09D 11/02 (2006.01)
C09B 67/22 (2006.01)
G02B 5/20 (2006.01)

(52) U.S. Cl. .................. 106/31.8; 106/493; 106/494; 106/496; 353/84; 430/7

(58) Field of Classification Search ........... 106/31.8, 106/493, 494, 496; 430/7; 353/84
See application file for complete search history.

(56) References Cited

U.S. PATENT DOCUMENTS

| | | | |
|---|---|---|---|
| 4,251,441 A | 2/1981 | Frolich et al. | |
| 4,457,783 A | 7/1984 | Hamilton et al. | |
| 6,117,606 A | 9/2000 | Macholdt et al. | |
| 6,261,354 B1 | 7/2001 | Vermoortele et al. | |
| 6,469,147 B2 | 10/2002 | Nickel et al. | |
| 6,475,543 B2 | 11/2002 | Kaul | |
| 6,504,045 B2 | 1/2003 | Jung et al. | |
| 6,602,342 B2 | 8/2003 | Schmidt et al. | |
| 2007/0125260 A1* | 6/2007 | Grimm et al. .............. | 106/31.6 |

FOREIGN PATENT DOCUMENTS

| | | |
|---|---|---|
| DE | 2727531 | 12/1978 |
| EP | 1257602 | 1/1979 |
| EP | 0079303 | 5/1983 |
| EP | 1315588 | 6/2003 |
| FR | 2394584 | 1/1979 |

OTHER PUBLICATIONS

U.S. Appl. No. 10/582,769 by Grimm et al, filed Jun. 12, 2006.
U.S. Appl. No. 10/582,770 by Grimm et al., filed Jun. 12, 2006.
Lin Dongzhi et al., "An Investigation into The Synergism of Monoazoacetoacetanilide Pigments;" Dyes and Pigments, Elsevier Applied Science Publishers, Barking, GB, vol. 18, No. 1, pp. 69-80; Jan. 1992.
International Search Report for PCT/EP 2005/001375, mailed Jun. 23, 2005.
English Translation of International Preliminary Report on Patentability, for PCT/EP 2005/001375, Nov. 17, 2006.

* cited by examiner

*Primary Examiner*—Anthony J. Green
(74) *Attorney, Agent, or Firm*—Richard P. Silverman

(57) ABSTRACT

The invention relates to the use of a pigment composition containing between 86.0 and 99.9 total mol % of C.I. Pigment Yellow 74 molecules and between 14.0 and 0.1 total mol % of at least one monoazo pigment of the formula (1)

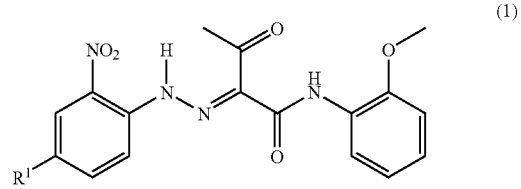

(1)

wherein $R^1$ represents Cl, $OCH_3$, $OH_3$ or $NO_2$ as a coloring agent for pigmenting ink-jet inks and color filters.

10 Claims, No Drawings

USE OF A PIGMENT COMPOSITION COMPRISING MIXED CRYSTALS BASED ON CI PIGMENT YELLOW 74

The present invention relates to new uses of specific monoazo pigment compositions based on C.I. Pigment Yellow 74, especially for ink-jet printing and for color filters.

The ink-jet process is a non-impact printing process wherein droplets of the recording liquid are guided from one or more nozzles onto the substrate that is to be printed. In order for prints of excellent quality to be obtained it is necessary for the recording liquids and the colorants they contain to satisfy exacting requirements, in respect not least of the desired hue and of reliability in the course of the printing operation.

Besides dye-based inks, there has recently also been increased use of pigmented inks in ink-jet printing. The fine division of the pigments present in the inks is a fundamental prerequisite for their use in ink-jet printing, in order on the one hand to prevent clogging of the nozzles and on the other hand to achieve high transparency and a desired hue.

The use of C.I. Pigment Yellow 74 in ink-jet inks is general knowledge. Nevertheless, the pigments used in these inks often fail to meet the requirements imposed on them with regard to a desired greenish yellow hue while at the same time ensuring a flawless printing operation without clogging of the nozzles.

Mixtures of different monoazo yellow pigments with C.I. Pigment Yellow 74 are known which are intended to produce improvements in various applications. EP-00 79 303 A3 describes a hiding form of C.I. Pigment Yellow 74, comprising a mixture of 99.0% to 80.0% by weight of C.I. Pigment Yellow 74 and 1.0 to 20.0% by weight of a different monoazo yellow pigment based on acetoacet-o-anisidide. DE-A-27 27 531 (corresponding to U.S. Pat. No. 4,251,441 and FR-A-23 94 584) discloses mixtures of 75% to 85% by weight of C.I. Pigment Yellow 74 and 25% to 15% by weight of C.I. Pigment Yellow 65. In order to improve the dispersing properties these mixtures are admixed with alkali-soluble products of resin type, such as rosins or rosin derivatives, for example.

U.S. Pat. No. 6,261,354 discloses a transparent, resin-containing pigment composition as a colorant in conventional printing inks. Said composition is prepared by coupling a mixture of diazonium salts obtainable from 98 to 85 mol % of 2-methoxy-4-nitroaniline and 2 to 15 mol % of 4-chloro-2-nitroaniline with acetoacet-o-anisidide.

None of the patents specified above describes the use of the pigment mixtures in the ink-jet printing process. Furthermore, the adjuvants described in some cases in the preparation processes, such as rosins or their derivatives, for example, have an adverse effect on the suitability of the pigments treated therewith in ink-jet printing, since they can lead to clogging of the nozzles. In many cases a reddish yellow is obtained.

It was an object of the present invention, therefore, to prepare transparent, greenish yellow pigment compositions on the basis of C.I. Pigment Yellow 74 that do not have the disadvantages specified above and that are suitable in particular as colorants for the ink-jet printing process and for color filters.

It has been found that this object is achieved, surprisingly, through the use of specific pigment compositions, defined below.

The invention provides for the use of a pigment composition containing between 86.0 and 99.9 overall mol %, preferably between 86.5 and 99.5 overall mol %, in particular between 87.0 and 94.0 overall mol %, of C.I. Pigment Yellow 74 molecules and between 14.0 and 0.1 overall mol %, preferably between 13.5 and 0.5 overall mol %, in particular between 13.0 and 6.0 overall mol %, of at least one monoazo pigment of the formula (1)

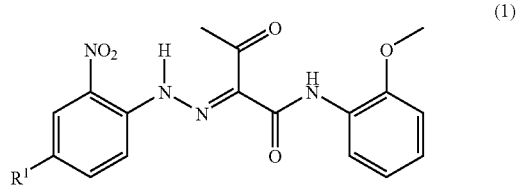

in which $R^1$ is Cl, $OCH_3$, $CH_3$ or $NO_2$ as a colorant for pigmenting ink-jet inks and color filters.

The compound of the formula (1) where $R^1$ is chloro is known as C.I. Pigment Yellow 73.

The compound of the formula (1) where $R^1$ is methoxy is known as C.I. Pigment Yellow 65.

The compound of the formula (1) where $R^1$ is methyl is known as C.I. Pigment Yellow 203.

Formula (1) should be understood as an idealized representation and also embraces the corresponding tautomeric forms and also the possible cis/trans isomers of each tautomeric form.

Of particular interest are pigment compositions containing between 88 and 92 overall mol % of C.I. Pigment Yellow 74 molecules and between 12 and 8 overall mol % of C.I. Pigment Yellow 65 molecules.

The pigment compositions used in accordance with the invention can be prepared by cosynthesis, by joint recrystallization or by joint finishing of C.I. Pigment Yellow 74 with the compound of the formula (1) in the stated molar proportions. In the case of cosynthesis a mixture of 5-nitro-2-aminoanisole and at least one amine of the formula (2)

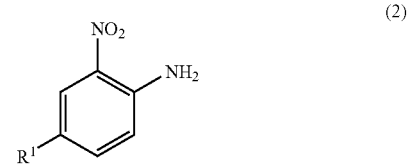

is diazotized and the product is coupled with acetoacet-o-anisidide in a temperature range between −5° C. and 80° C., preferably between 5° C. and 35° C., and at a pH of between pH 3 and pH 14, preferably between 3 and 11, in particular between pH 3.5 and pH 10, the molar mixing ratio of the stated amines being as described above.

The cosynthesis described produces a substantial fraction of mixed crystals of C.I. Pigment Yellow 74 in the compound of the formula (1). This substantial fraction is usually greater than 15% by weight, preferably greater than 30% by weight, by way of example greater than 50% by weight, and often greater than 75% by weight, based on the overall weight of the pigment composition. The remaining fraction of the pigment composition, that not consisting of mixed crystals, is composed of pure C.I. Pigment Yellow 74 or of a physical mixture of the compound of the formula (1).

The term "pigment composition" also includes, below, the case where the pigment composition is composed of only one mixed crystal of the invention.

By mixed crystals for the purposes of the present invention are meant also solid solutions. The properties of mixed crystals differ both from the properties of the individual components and from the properties of the physical mixtures of the individual components. In particular, the X-ray powder diagrams of the mixed crystals differ from those of the corresponding physical mixtures and from the sum of the powder diagrams of the individual compounds.

The mixed crystals themselves can contain between 0.1 and 99.9 mol %, preferably between 70.0 and 99.9 mol %, in particular between 85.0 and 99.9 mol % of C.I. Pigment Yellow 74 and between 99.9 and 0.1 mol %, preferably between 30.0 and 0.1 mol %, in particular between 15.0 and 0.1 mol %, of a compound of the formula (1) or of any desired mixture of two or more, 2 or 3 for example, compounds of the formula (1).

Preferred binary mixed crystals are composed of C.I. Pigment Yellow 74 and one of the compounds of the formula (1), especially those where $R^1$=$OCH_3$ or $R^1$=Cl, preferably in a molar ratio of 99.9:0.1 to 86.5:13.5, in particular of 99:1 to 87:13.

The mixed crystals may occur in a variety of crystal polymorphs. By way of example the mixed crystals may be isotypic with C.I. Pigment Yellow 74 or with one of the crystal polymorphs of one of the compounds of the formula (1).

Depending on the purity of the reactants, the concentrations, the applied temperatures and temperature profiles, the time profile of the synthesis and of any aftertreatment, the pressure, the presence of impurities or additives, and the presence of seed crystals, it is possible for only mixed crystals of a single phase to form, or for mixed crystals of different phases to form, or for a mixture of mixed crystals and of one or more pure compounds to form.

The mixed crystals are distinguished, surprisingly, by greenish yellow hues.

The pigment compositions of the invention can also be prepared for example by separately diazotizing 5-nitro-2-aminoanisole and one or more amines of the formula (2), with subsequent mixing of the diazonium salts, followed by coupling of the mixture with acetoacet-o-anisidide.

The pigment compositions of the invention can also be prepared for example by diazotizing an amine of the formula (2) in stages in the presence of diazotized 5-nitro-2-aminoanisole or by diazotizing 5-nitro-2-aminoanisole in the presence of one or more diazonium salts prepared by diazotization of amines of the formula (2), with subsequent coupling of the mixture with acetoacet-o-anisidide.

The pigment compositions of the invention can also be prepared by coupling at least one diazotized amine of the formula (2) with acetoacet-o-anisidide in the presence of ready-prepared C.I. Pigment Yellow 74.

The pigment compositions of the invention can also be prepared by coupling diazotized 5-nitro-2-aminoanisole with acetoacet-o-anisidide in the presence of at least one compound of the formula (1).

Compounds suitable for the diazotization reaction are alkali metal nitrites or the alkyl nitrites of short-chain alkanes, together with strong mineral acids. Particular suitability is possessed by sodium nitrite and hydrochloric acid. The reaction can be carried out within a temperature range from −5° C. to +35° C., preferably between 0° C. and 10° C. Although not necessary, it is possible for nonionic, anionic or cationic surface-active substances to be present during the diazotization. If desired it is also possible to use further auxiliaries, provided they do not detract from the advantages associated with the invention, especially the printing-related properties.

Coupling is possible by the direct or the indirect method, but is preferably accomplished directly: that is, the diazonium salt is added to the initial charge of coupling component. The coupling reaction can be carried out in a temperature range between −5° C. and 80° C., preferably between 5° C. and 25° C., and at a pH of between pH 3 and pH 14, preferably between 3 and 11, in particular between pH 3.5 and pH 10. The azocoupling reaction takes place preferably in aqueous solution or suspension, although it is also possible to use organic solvents, if desired in a mixture with water.

In general the coupling component is employed in a slight excess over the diazonium compound; preference is given to reacting one equivalent of diazo component with 1.001 to 1.10 equivalents of the coupling component.

After the coupling, the pigment compositions of the invention are preferably subjected to heat treatment in an aqueous, aqueous-organic or organic medium at temperatures between 60° C. and 90° C., preferably between 60° C. and 85° C., under superatmospheric pressure if desired, and for 1 to 6 hours. As described above, it is possible here for defined crystal phases to form or for phase inversions to occur. The pigment suspensions obtained can subsequently be subjected to conventional filtration, salt-free washing of the presscake with water, drying, and grinding. The pigment obtained from the synthesis can be subjected to conventional mechanical fine division, grinding for example.

To facilitate the formation of mixed crystal, to stabilize the mixed crystals, to enhance the coloristic properties and/or to achieve defined coloristic effects it is possible at any desired points in the process to add pigment dispersants, surface-active agents, defoamers, extenders or other adjuvants, provided these do not detract from the advantages associated with the invention, especially the printing-related properties. It is also possible to use mixtures of these additives. The additives can be added all at once or in two or more portions. The additives can be added at any point in the synthesis or in the various aftertreatments, or after the aftertreatments. The point in time that is best suitable must be determined beforehand by means of range finding tests.

It is also possible to carry out one or more of the aforementioned process steps for preparing the pigment compositions of the invention in a microreactor, as described for example in EP-A-1 257 602. In that case the heat treatment may also be significantly shorter than an hour, 0.01 to 600 seconds for example.

The pigment compositions of the invention can also be obtained by mixing C.I. Pigment Yellow 74 and one or more compounds of the formula (1), with subsequent treatment, such as recrystallization and/or heating in water and/or solvent, for example, at either atmospheric or superatmospheric pressure.

From the prior art it is known to coat pigments and pigment compositions with rosins in order to enhance their dispersing properties in offset printing inks. It has been found that resin-coated pigments and pigment compositions have adverse effects in ink-jet printing, by possibly leading to nozzle failure. Surprisingly it has been found that the pigment composition described in accordance with the invention is able to do largely (at most 5% by weight, preferably at most 1% by weight) or wholly without rosins, while nevertheless being adequately dispersible in an ink-jet ink base and leading to outstanding printing results.

Ink-jet inks can be prepared by dispersing the pigment composition into the microemulsion medium, into the non-aqueous medium or into the medium for preparing the UV-curable ink, or into the wax for preparing a hotmelt ink-jet ink. Advantageously the printing inks obtained in these procedures are subsequently filtered for ink-jet applications (e.g., through a 1 μm filter).

Solvent-based ink-jet inks contain substantially 0.5% to 30% by weight, preferably 1% to 15% by weight, of the pigment composition of the invention, 70% to 95% by weight of an organic solvent or solvent mixture and/or of a hydrotropic compound. If desired, the solvent-based ink-jet inks may comprise carrier materials and binders which are soluble in the "solvent", such as polyurethanes, natural and synthetic rubber, polyvinyl chloride, vinyl chloride/vinyl acetate copolymers, polyvinylbutyrals, wax/latex systems or combinations of these compounds, for example.

If desired, the solvent-based ink-jet inks may further comprise additional additives, such as wetting agents, devolatilizers/defoamers, preservatives, and antioxidants, for example.

Microemulsion inks are based on organic solvents, water, and, if desired, an additional substance which acts as an interface mediator (surfactant). Microemulsion inks contain 0.5% to 30% by weight, preferably 1% to 15% by weight, of the pigment composition of the invention, 0.5% to 95% by weight of water, and 0.5% to 95% by weight of organic solvents and/or interface mediators. UV-curable inks contain substantially 0.5% to 30% by weight of the pigment composition of the invention, 0.5% to 95% by weight of water, 0.5% to 95% by weight of an organic solvent or solvent mixture, 0.5% to 50% by weight of radiation-curable binder, and, if desired, 0 to 10% by weight of a photoinitiator. Hotmelt inks are based typically on waxes, fatty acids, fatty alcohols or sulfonamides which are solid at room temperature and become liquid on heating, the preferred melting range being situated at between about 60° C. and about 140° C. Hotmelt ink-jet inks are composed substantially of 20% to 90% by weight of wax and 1% to 10% by weight of the pigment composition of the invention. In addition it is possible for there to be 0 to 20% by weight of an additional polymer (as "dye dissolver"), 0 to 5% by weight of dispersant, 0 to 20% by weight of viscosity modifier, 0 to 20% by weight of plasticizer, 0 to 10% by weight of tack additive, 0 to 10% by weight of transparency stabilizer (preventing, for example, the crystallization of the wax), and 0 to 2% by weight of antioxidant.

The pigment compositions of the invention are additionally suitable for use as colorants for color filters, both for additive and for subtractive color generation, and also as colorants for electronic inks ("e-inks") or electronic paper ("e-paper"). In the case of the production of what are called color filters, both reflective and transparent color filters, pigments are applied in the form of a paste or as pigmented photoresists in appropriate binders (acrylates, acrylic esters, polyimides, polyvinyl alcohols, epoxides, polyesters, melamines, gelatins, caseins) to the respective LCD components (e.g., TFT-LCD—thin film transistor liquid crystal displays—or, e.g., (S)TN-LCD—(super)twisted nematic LCDs). Besides high thermal stability, a high pigment purity is another prerequisite for a stable paste or pigmented photoresist. Furthermore, the pigmented color filters may also be applied by ink-jet or other appropriate printing processes.

It will be appreciated that the pigment compositions of the invention can also be employed generally for pigmenting high molecular mass organic materials of natural or synthetic origin, such as, for example, plastics, resins, varnishes, paints, electrophotographic toners and developers, electret materials, inks, including printing inks, and seed.

In the examples which follow, parts are in each case by weight and percentages are in each case by weight. By "overall mol %" is meant the molar percentage of a specified chemical compound in the overall pigment composition.

I. Preparation of Pigment Compositions

EXAMPLE 1

90 overall mol % C.I. Pigment Yellow 74 and 10 overall mol % C.I. Pigment Yellow 65 a) Diazo 121.1 parts of 5-nitro-2-aminoanisole and 13.5 parts of 3-nitro-4-aminoanisole are slurried in 336 parts of water and 188 parts of 31% strength hydrochloric acid. The suspension is cooled to 0° C. using 672 parts of ice/water mixture and diazotized by addition of 107.8 parts of 40% strength sodium nitrite solution. The diazo solution is clarified by addition of 1.92 parts of ®Decalite and subsequent filtration.

b) Coupler 165.8 parts of acetoacet-o-anisidide are dissolved in 2152 parts of water and 94.1 parts of 33% strength sodium hydroxide solution. Ice is added to effect cooling to 10° C., the coupler is precipitated with 80 parts of 80% strength acetic acid, and the product is adjusted to a pH of 9.8 using 33% strength sodium hydroxide solution.

c) Coupling

The diazo solution is added to the coupler over one hour. In the course of this addition the pH is kept at 3.8 to 4.2 using 6% strength sodium hydroxide solution. The suspension is then stirred at 80° C. for 1 hour. It is then filtered and the presscake is dried at 60° C.

Two different mixed crystals are produced. One mixed crystal produced (high amount of C.I. Pigment Yellow 74 and low amount of pigment of the formula (1) with $R^1$=$OCH_3$) is isotypical with C.I. Pigment Yellow 74; the other mixed crystal produced (low amount of C.I. Pigment Yellow 74 and high amount of pigment of the formula (1) with $R^1$=$OCH_3$) is isotypic with the crystal structure of the pure pigment of the formula (1) with $R^1$=$OCH_3$.

This pigment composition of the invention is notable in the X-ray powder diagram for the following characteristic lines (Cu—$K_\alpha$ radiation, 2 theta values in degrees, measurement accuracy +/−0.2°, intensities: vs=very strong, s=strong, m=medium, w=weak, all other lines very weak):

| 2 theta: | relative intensity: |
|---|---|
| 7.53 | m |
| 8.73 | |
| 10.39 | m |
| 11.36 | |
| 11.86 | vs |
| 12.79 | |
| 13.37 | w |
| 15.17 | w |
| 16.12 | |
| 17.27 | |
| 17.74 | m, broad |
| 18.37 | |
| 18.89 | |
| 19.73 | |
| 20.24 | m |
| 21.08 | m |
| 22.00 | |
| 22.83 | w |
| 24.03 | w |
| 25.21 | m, shoulder |
| 25.57 | s |
| 26.47 | s-m |

-continued

| 2 theta: | relative intensity: |
|---|---|
| 26.79 | vs |
| 27.33 | m |
| 28.21 | |
| 30.12 | |
| 30.79 | |
| 31.51 | |
| 33.60 | |

This resultant mixture of two different mixed crystals of the invention is notable for a greenish yellow hue relative to C.I. Pigment Yellow 74. This is surprising, since pure pigment of the formula (1) with $R^1$=$OCH_3$ possesses a significantly redder hue than C.I. Pigment Yellow 74. The X-ray powder diagram of the pigment composition of the invention differs markedly from the X-ray powder diagram of a physical mixture of separately prepared C.I. Pigment Yellow 74 and the monoazo pigment of the formula (1) with $R^1$=$OCH_3$ in a molar ratio of 9:1.

EXAMPLE 2

93 overall mol % C.I. Pigment Yellow 74 and 7 overall mol % C.I. Pigment Yellow 65

The synthesis is as in example 1, but using 125.1 parts of 5-nitro-2-aminoanisole and 9.4 parts of 3-nitro-4-aminoanisole. This gives a mixture of mixed crystals.

EXAMPLE 3

95 overall mol % C.I. Pigment Yellow 74 and 5 overall mol % C.I. Pigment Yellow 65

The synthesis is as in example 1, but using 127.8 parts of 5-nitro-2-aminoanisole and 6.7 parts of 3-nitro-4-aminoanisole. This gives a mixture of mixed crystals.

EXAMPLE 4

97 overall mol % C.I. Pigment Yellow 74 and 3 overall mol % C.I. Pigment Yellow 65

The synthesis is as in example 1, but using 130.5 parts of 5-nitro-2-aminoanisole and 4.0 parts of 3-nitro-4-aminoanisole.

EXAMPLE 5

98 overall mol % C.I. Pigment Yellow 74 and 2 overall mol % C.I. Pigment Yellow 65

The synthesis is as in example 1, but using 131.8 parts of 5-nitro-2-aminoanisole and 2.7 parts of 3-nitro-4-aminoanisole. This gives a mixed crystal.

EXAMPLE 6

90 overall mol % C.I. Pigment Yellow 74 and 10 overall mol % C.I. Pigment Yellow 73 a) Diazo 121.1 parts of 5-nitro-2-aminoanisole and 13.8 parts of 2-nitro-4-chloroaniline are slurried in 336 parts of water and 188 parts of 31% strength hydrochloric acid. The suspension is cooled to 0° C. using 672 parts of ice/water mixture and diazotized by addition of 107.8 parts of 40% strength sodium nitrite solution. The diazo solution is clarified by addition of 1.92 parts of Decalite and subsequent filtration.

b) Coupler 165.8 parts of acetoacet-o-anisidide are dissolved in 2152 parts of water and 94.1 parts of 33% strength sodium hydroxide solution. Ice is added to effect cooling to 10° C., the coupler is precipitated with 80 parts of 80% strength acetic acid, and the product is adjusted to a pH of 9.8 using 33% strength sodium hydroxide solution.

c) Coupling

The diazo solution is added to the coupler over one hour. In the course of this addition the pH is kept at 3.8 to 4.2 using 6% strength sodium hydroxide solution. The suspension is then stirred at 80° C. for 1 hour. It is then filtered and the presscake is dried at 60° C.

The mixed crystal obtained is notable for a greenish yellow hue relative to C.I. Pigment Yellow 74. This is surprising, since pure pigment C.I. Pigment Yellow 73 possesses a redder hue than C.I. Pigment Yellow 74. The mixed crystal produced is isotypic with C.I. Pigment Yellow 74 and is distinguished in the X-ray powder diagram by the following characteristic lines (Cu—$K_\alpha$ radiation, 2 theta values in degrees, measurement accuracy +/−0.2°, intensities: vs=very strong, s=strong, m=medium, w=weak, all other lines very weak):

| 2 theta: | relative intensity: |
|---|---|
| 7.50 | m |
| 8.74 | |
| 11.36 | |
| 11.84 | vs |
| 13.36 | |
| 15.14 | |
| 16.11 | |
| 17.29 | |
| 17.72 | m |
| 20.25 | m |
| 21.12 | m |
| 22.09 | |
| 22.82 | |
| 23.98 | |
| 25.57 | s |
| 26.76 | vs |
| 27.35 | |
| 28.08 | |
| 30.81 | |
| 31.40 | |
| 32.45 | |
| 33.63 | |

If, in contrast, C.I. Pigment Yellow 74 and C.I. Pigment Yellow 73 are synthesized individually with the same process, and the pigments are subsequently physically mixed in a molar ratio of 9:1, the distinctly different X-ray powder diagram obtained is as follows:

| 2 theta: | relative intensity: |
|---|---|
| 5.03 | |
| 7.55 | m |
| 8.76 | |
| 10.21 | |
| 10.80 | |
| 11.34 | |
| 11.88 | vs |
| 13.43 | |
| 15.17 | |
| 17.16 | |
| 17.67/17.83 | m (twin peak) |
| 20.18 | m |
| 21.14 | m |

-continued

| 2 theta: | relative intensity: |
|---|---|
| 22.07 | |
| 22.85 | |
| 23.28 | |
| 24.03 | |
| 24.97 | shoulder |
| 25.55 | s |
| 26.80 | vs |
| 27.43 | m |
| 28.16 | |
| 30.76 | |
| 31.46 | |
| 32.50 | |
| 33.77 | |

This physical mixture of C.I. Pigment Yellow 74 and C.I. Pigment Yellow 73 in a molar ratio of 9:1 has a markedly redder hue than the above-described pigment composition of the invention made up of C.I. Pigment Yellow 74 and C.I. Pigment Yellow 73 in a molar ratio of 9:1.

EXAMPLE 7

95 overall mol % C.I. Pigment Yellow 74 and 5 overall mol % C.I. Pigment Yellow 73

The synthesis is as in example 6, but using 127.8 parts of 5-nitro-2-aminoanisole and 6.9 parts of 2-nitro-4-aminoaniline. This gives a mixed crystal.

EXAMPLE 8

95 overall mol % C.I. Pigment Yellow 74 and 5 overall mol % C.I. Pigment Yellow 203 a) Diazo 127.8 parts of 5-nitro-2-aminoanisole and 6.1 parts of 2-nitro-4-methylaniline are slurried in 336 parts of water and 188 parts of 31% strength hydrochloric acid. The suspension is cooled to 0° C. using 672 parts of ice/water mixture and diazotized by addition of 107.8 parts of 40% strength sodium nitrite solution. The diazo solution is clarified by addition of 1.92 parts of Decalite and subsequent filtration.

b) Coupler 165.8 parts of acetoacet-o-anisidide are dissolved in 2152 parts of water and 94.1 parts of 33% strength sodium hydroxide solution. Ice is added to effect cooling to 10° C., the coupler is precipitated with 80 parts of 80% strength acetic acid, and the product is adjusted to a pH of 9.8 using 33% strength sodium hydroxide solution.

c) Coupling

The diazo solution is added to the coupler over one hour. In the course of this addition the pH is kept at 3.8 to 4.2 using 6% strength sodium hydroxide solution. The suspension is then stirred at 80° C. for 1 hour. It is then filtered and the presscake is dried at 60° C.

Comparative example 9 (according to DE-A-27 27 531, but without resin): 85 overall mol % C.I. Pigment Yellow 74 and 15 overall mol % C.I. Pigment Yellow 65 a) Diazo 114.2 parts of 5-nitro-2-aminoanisole and 20.2 parts of 3-nitro-4-aminoanisole are converted into the hydrochlorides in a mixture of 246 parts of 31% strength hydrochloric acid and 84 parts of water, and are diazotized at 0-10° C. with 138 parts of 40% strength sodium nitrite solution.

b) Coupler 172.4 parts of acetoacet-o-anisidide are dissolved at room temperature in 2400 parts of water and 162.8 parts of 33% strength sodium hydroxide solution, and this solution is admixed with a solution of an anionic dispersant containing 3 parts of the sodium salt of the diisodecyl ester of sulfosuccinic acid. Thereafter the acetoacet-o-anisidide is precipitated from the solution at 15° C. by addition of 92.4 parts of glacial acetic acid, to give a fine suspension. The pH is raised to 6.5.

c) Coupling

Coupling is carried out by continuous addition of the clarified diazonium salt solution, over the course of 1 hour. The suspension of the coupling product is heated at 90° C. for 1 hour. By dilution with cold water it is then cooled to 70° C. and the ready-prepared pigment is isolated by suction filtration, washed, dried, and ground.

II. Production of Colorant Preparations

The pigment composition, either as a powder or as a presscake, was pasted up together with the dispersants specified below, the organic solvent, and the other adjuvants in deionized water, and then homogenized and predispersed using a dissolver. Subsequent fine dispersion took place by means of a bead mill, grinding taking place, with accompanying cooling, until the desired particle size distribution of the pigment particles was obtained. Thereafter the dispersion was adjusted with deionized water to the desired final pigment concentration.

The colorant preparations described in the inventive and comparative examples below were produced by the process described above, the ingredients below being used in the amounts indicated so as to give 100 parts of the respective colorant preparations, with parts denoting parts by weight.

INVENTIVE EXAMPLE A

| 20 parts | pigment composition from example 1 |
|---|---|
| 2.5 parts | acrylate resin, Na salt (dispersant) |
| 1.2 parts | polyethylene glycol alkyl ether, Na salt (dispersant) |
| 7.5 parts | propylene glycol |
| 0.2 part | preservative |
| remainder | water |

INVENTIVE EXAMPLE B

| 20 parts | pigment composition from example 3 |
|---|---|
| 2.5 parts | acrylate resin, Na salt (dispersant) |
| 1.2 parts | polyethylene glycol alkyl ether, Na salt (dispersant) |
| 7.5 parts | propylene glycol |
| 0.2 part | preservative |
| remainder | water |

INVENTIVE EXAMPLE C

| 20 parts | pigment composition from example 6 |
|---|---|
| 2.5 parts | acrylate resin, Na salt (dispersant) |
| 1.2 parts | polyethylene glycol alkyl ether, Na salt (dispersant) |
| 7.5 parts | propylene glycol |

-continued

| | |
|---|---|
| 0.2 part | preservative |
| remainder | water |

INVENTIVE EXAMPLE D

| | |
|---|---|
| 20 parts | pigment composition from example 7 |
| 2.5 parts | acrylate resin, Na salt (dispersant) |
| 1.2 parts | polyethylene glycol alkyl ether, Na salt (dispersant) |
| 7.5 parts | propylene glycol |
| 0.2 part | preservative |
| remainder | water |

COMPARATIVE EXAMPLE E

| | |
|---|---|
| 20 parts | commercial C.I. Pigment Yellow 74 containing rosin |
| 2.5 parts | acrylate resin, Na salt (dispersant) |
| 1.2 parts | polyethylene glycol alkyl ether, Na salt (dispersant) |
| 7.5 parts | propylene glycol |
| 0.2 part | preservative |
| remainder | water |

COMPARATIVE EXAMPLE F

| | |
|---|---|
| 20 parts | C.I. Pigment Yellow 74 without rosin |
| 2.5 parts | acrylate resin, Na salt (dispersant) |
| 1.2 parts | polyethylene glycol alkyl ether, Na salt (dispersant) |
| 7.5 parts | propylene glycol |
| 0.2 part | preservative |
| remainder | water |

COMPARATIVE EXAMPLE G

| | |
|---|---|
| 20 parts | pigment composition from comparative example 9 |
| 2.5 parts | acrylate resin, Na salt (dispersant) |
| 1.2 parts | polyethylene glycol alkyl ether, Na salt (dispersant) |
| 7.5 parts | propylene glycol |
| 0.2 part | preservative |
| remainder | water |

COMPARATIVE EXAMPLE H

| | |
|---|---|
| 18 parts | commercial C.I. Pigment Yellow 74 containing rosin |
| 2 parts | C.I. Pigment Yellow 65 |
| 2.5 parts | acrylate resin, Na salt (dispersant) |
| 1.2 parts | polyethylene glycol alkyl ether, Na salt (dispersant) |
| 7.5 parts | propylene glycol |
| 0.2 part | preservative |
| remainder | water |

III. Testing the Coloristic Properties of the Colorant Preparations

UV-Vis:

For the recording of the UV-Vis spectra, the colorant preparations were diluted with distilled water and subjected to measurement by means of a Perkin Elmer lambda 20, in the range from 300 to 700 nm. The values reported in table 1 represent the respective absorption maxima.

Color Strength, Difference in Hue, and Transparency:

To determine the color strength difference and hue difference dH, in a white reduction, 0.5 g of each colorant preparation was homogenized with 50.0 g of standard white dispersion and drawn down onto a test chart. Thereafter the coloristic properties (color strength and hue -dH-) were determined by means of a Minolta CM-3700d spectrophotometer.

The transparency was determined by homogenizing 2.5 g of each colorant preparation with 12.5 g of distilled water and 10.0 g of an acrylate varnish and drawing down the resulting composition onto a test chart. The transparency was subsequently assessed visually.

The standard employed for the color strength (100%), the hue difference dH, and the transparency was the colorant preparation of comparative example F.

The hue difference dH was assessed as follows:
−VI dH>−2.01 (significantly redder)
−V dH=−1.41 to −2.00 (substantially redder)
−IV dH=−0.81 to −1.40 (distinctly redder)
−III dH=−0.51 to −0.80 (markedly redder)
−II dH=−0.21 to −0.50 (somewhat redder)
−I dH=−0.11 to −0.20 (a trace redder)
/=/ dH=0.10 to −0.10 (approximately the same)
+I dH=0.11 to 0.20 (a trace greener)
+II dH=0.21 to 0.50 (somewhat greener)
+III dH=0.51 to 0.80 (markedly greener)
+IV dH=0.81 to 1.40 (distinctly greener)
+V dH=1.41 to 2.00 (substantially greener)
+VI dH>2.01 (significantly greener)

The transparency was assessed as follows:
−VI significantly more hiding
−V substantially more hiding
−IV distinctly more hiding
−III markedly more hiding
−II somewhat more hiding
−I a trace more hiding
/=/ approximately the same
+I a trace more transparent
+II somewhat more transparent
+III markedly more transparent
+IV distinctly more transparent
+V substantially more transparent
+VI significantly more transparent The results obtained for the UV-Vis maxima, the color strength, the shift in hue, dH and the transparency are reproduced in table 1:

TABLE 1

| | UV-Vis [nm] | Color strength [%] | dH | Transparency |
|---|---|---|---|---|
| Comparative example | | | | |
| F | 438 | 100 | — | — |
| G | 433 | 97 | −I | /=/ |
| H | 439 | 94 | −III | +I |

TABLE 1-continued

| Example | UV-Vis [nm] | Color strength [%] | dH | Transparency |
|---|---|---|---|---|
| A | 429 | 119 | +II | +VI |
| B | 430 | 122 | +III | +V |
| C | 431 | 112 | +IV | +IV |
| D | 434 | 115 | +III | +III |

It is apparent that the colorant preparations of the invention (examples A to D), in comparison to the colorant preparation based on pure C.I. Pigment Yellow 74, have an absorption maximum at smaller wavelengths in the UV-Vis spectrum and therefore represent a more greenish yellow than the latter. Furthermore, the color strength of the colorant preparations of the invention in the white reduction is significantly higher as compared with the colorant preparation based on pure C.I. Pigment Yellow 74. Moreover, the colorant preparations of the invention are more transparent and greener in hue in the white reduction than the colorant preparation based on pure C.I. Pigment Yellow 74.

The colorant preparation obtained by co-grinding of C.I. Pigment Yellow 74 and C.I. Pigment Yellow 65 in a molar ratio of 9:1 (comparative example H) has a substantially redder hue as compared with the colorant preparation based on the co-coupling of the two pigments (example A) in the same proportion. Furthermore, the colorant preparation from comparative example H is more hiding and weaker in color.

IV. Testing the Printing-Related Properties of the Colorant Preparations

In order to assess the printing-related properties, test inks were produced from the colorant preparations of inventive examples A to D and comparative example E, and their printing properties were investigated using a thermal ink-jet printer.

To produce the testing inks the colorant preparations were first precision-filtered through a 1 µm filter in order to separate off grinding media detritus and any coarse fractions. Thereafter the filtered colorant preparations were diluted with water and admixed with further low molecular mass alcohols and polyols. The test inks then had the following composition:

| 25 parts | colorant preparation |
| 10 parts | ethylene glycol |
| 10 parts | diethylene glycol |
| 50 parts | demineralized water |

Using an HP 960C printer (Hewlett Packard), test images were printed on commercial standard paper (copier paper) and specialty paper (premium quality) from Hewlett Packard. Assessment of the quality and accuracy of the printed image was made by visual inspection.

The results are reproduced in table 2.

TABLE 2

| | Print quality |
|---|---|
| Comparative example E | Ink does not print! |
| Inventive example A | very good |
| Inventive example B | very good |

TABLE 2-continued

| | Print quality |
|---|---|
| Inventive example C | very good |
| Inventive example D | very good |

The test inks produced from the colorant preparations of inventive examples A to D exhibited very good printing behavior in this test. The test ink based on a colorant preparation comprising rosin (comparative example E), however, leads to immediate failure of the printing nozzles.

The invention claimed is:

1. A colorant for pigmenting an inkjet-ink or a color filter comprising a pigment composition comprising between 86.0 and 99.9 overall mol % of C.I. Pigment Yellow 74 molecules and between 14.0 and 0.1 overall mol % of at least one monoazo pigment of the formula (1)

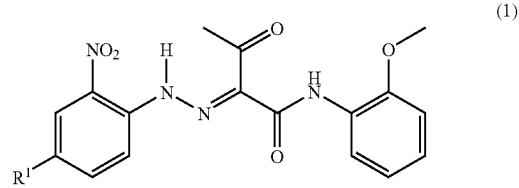

wherein $R^1$ is Cl, $OCH_3$, $CH_3$ or $NO_2$ wherein the pigment composition comprises more than 15% by weight, based on the overall weight of the pigment composition, of mixed crystals of C.I. Pigment Yellow 74 and the at least one monoazo pigment of formula (1) and wherein the mixed crystals contain between 70 and 99.9 mol % of Pigment Yellow 74 and between 30 and 0.1 mol % of the at least one monoazo pigment of formula (1).

2. The colorant as claimed in claim 1, wherein the pigment composition comprises between 86.5 and 99.5 overall mol % of the C.I. Pigment Yellow 74 molecules and between 13.5 and 0.5 overall mol % of the at least one monoazo pigment of the formula (1).

3. The colorant as claimed in claim 1, wherein the pigment composition comprises between 87.0 and 94.0 overall mol % of the C.I. Pigment Yellow 74 molecules and between 13.0 and 6.0 overall mol % of the at least one monoazo pigment of the formula (1).

4. The colorant as claimed in claim 1, wherein the pigment composition comprises between 88 and 92 overall mol % of the C.I. Pigment Yellow 74 molecules and between 12 and 8 overall mol % of C.I. Pigment Yellow 65 molecules.

5. The colorant as claimed in claim 1, wherein the pigment composition comprises more than 30% by weight, based on the overall weight of the pigment composition, of mixed crystals of the C.I. Pigment Yellow 74 and the at least one monoazo pigment of the formula (1).

6. The colorant as claimed in claim 1, wherein the pigment composition comprises more than 50% by weight, based on the overall weight of the pigment composition, of mixed crystals of the C.I. Pigment Yellow 74 and the at least one monoazo pigment of the formula (1).

7. The colorant as claimed in claim 1, wherein the pigment composition comprises more than 75% by weight, based on the overall weight of the pigment composition, of mixed crystals of the C.I. Pigment Yellow 74 and the at least one monoazo pigment of the formula (1).

8. The colorant as claimed in claim 1, wherein the pigment composition is substantially free from alkali-soluble resins.

9. An ink-jet ink or a color filter pigmented with the colorant according to claim 1.

10. A method of coloring an ink-jet ink or a color filter comprising the step of adding to the ink-jet ink or color filter a pigment composition comprising between 86.0 and 99.9 overall mol % of C.I. Pigment Yellow 74 molecules and between 14.0 and 0.1 overall mol % of at least one monoazo pigment of the formula (1)

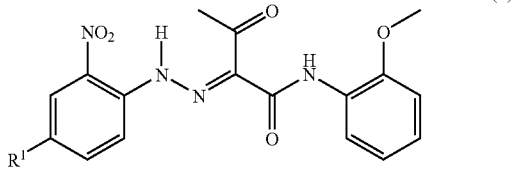

wherein $R^1$ is Cl, $OCH_3$, $OH_3$ or $NO_2$.

* * * * *